United States Patent [19]

Spietschka et al.

[11] Patent Number: 4,655,845
[45] Date of Patent: Apr. 7, 1987

[54] PROCESS FOR PREPARING ORGANIC PIGMENTS HAVING EXCELLENT APPLICATION PROPERTIES

[75] Inventors: Ernst Spietschka, Idstein; Manfred Urban, Wiesbaden, both of Fed. Rep. of Germany

[73] Assignee: Hoechst Aktiengesellschaft, Fed. Rep. of Germany

[21] Appl. No.: 770,698

[22] Filed: Aug. 29, 1985

[30] Foreign Application Priority Data

Sep. 3, 1984 [DE] Fed. Rep. of Germany ....... 3432319

[51] Int. Cl.$^4$ .............................................. C04B 14/00
[52] U.S. Cl. .................................. 106/309; 106/288 Q
[58] Field of Search ........................... 106/309, 288 Q

[56] References Cited

U.S. PATENT DOCUMENTS

| | | | |
|---|---|---|---|
| 3,265,699 | 8/1966 | Jaffe | 546/49 |
| 4,057,436 | 11/1977 | Davies et al. | 106/308 N |
| 4,153,602 | 5/1979 | Schiessler et al. | 546/37 |
| 4,432,796 | 2/1984 | Santimauro | 106/19 |
| 4,522,654 | 6/1985 | Chisvette et al. | 106/288 Q |

FOREIGN PATENT DOCUMENTS 997476 7/1965 United Kingdom .
1463141 2/1977 United Kingdom .

*Primary Examiner*—Paul Lieberman
*Assistant Examiner*—Willie J. Thompson
*Attorney, Agent, or Firm*—Connolly and Hutz

[57] ABSTRACT

Process for preparing organic pigments having excellent application properties, which comprises treating finely divided crude pigments of the anthanthrone, pyranthrone, isoviolanthrone, azo, quinacridone, flavanthrone, indanthrone, naphthaldazine, indigo, thioindigo, tetracarboximide, dioxazine, isoindolinone, perylene, anthrapyrimidine, acylanthraquinone, dianthraquinonyl, azoanthraquinone, azomethineanthraquinone and phthalocyanine series at temperatures of 0° C. to 100° C., with acid esters of polyphosphoric acid and a primary, secondary or tertiary alkanol of 1 to 8 carbon atoms, a glycol, glycol ether or phenol, then hydrolyzing the polyphosphate ester used, heating the resultant aqueous mixture to temperatures of 20° C. to 150° C., and isolating the pigment in conventional manner.

4 Claims, No Drawings

PROCESS FOR PREPARING ORGANIC PIGMENTS HAVING EXCELLENT APPLICATION PROPERTIES

The invention relates to a process for preparing organic pigments having excellent application properties by treating finely divided crude pigments (hereinafter referred to as prepigments) with acid polyphosphate esters.

The industrial use of organic pigments requires their optimum dispersion in the corresponding application media, such as finishes, plastic compositions and printing inks. For this reason the preparation of organic pigments necessitates special measures. These measures come under the terms dispersing, finishing and conditioning. Depending on the underlying colored species, it is possible to obtain direct dispersion in the course of the synthesis, as for example in the case of many azo pigments. With other classes of pigment, in particular those of the polycyclic series, the products are obtained from the synthesis in the form of coarse crystals, and for that reason the synthesis is followed by dispersion processes, such as, for example, roll or vibratory milling, reprecipitation from, for example, sulfuric acid or vatting and subsequent reoxidation. The products which are obtained from the synthesis in finely divided form or are prepared by the abovementioned dispersion methods and are referred to hereinafter as "prepigments" are usually of poor crystal quality, highly agglomerated and for that reason unsuitable for direct use for coloring finishes, plastic compositions and printing inks. To obtain optimum application properties there are a number of additional treatment processes, suc as, for example, aftertreatment with water, solvents, acids, alkalis, addition of surface-active agents and/or heat treatment. These processes are generally referred to as finishing processes.

European Offenlegungsschrift No. 0,075,182 (U.S. Pat. No. 4,432,796) describes a process wherein the prepigment is prepared from the synthesis product ("crude pigment") by treatment with polyphosphoric acid and subsequent hydrolysis, which may be followed by known finishing variants. According to said European Offenlegungsschrift the process is a dispersion process (referred to in said European Offenlegungsschrift No. 0,075,182 as conditioning) which is sulfuric acid is used is known as acid pasting.

U.S. Pat. No. 3,265,699 describes a process wherein the synthesis product (quinacridone pigments) is precipitated in finely divided form by solvolysis of the solution of the pigment in polyphosphoric acid by means of low alcohols.

With the processes of said U.S. Pat. No. 3,265,699 and said European Offenlegungsschrift, in each case a "crude pigment" is dissolved or suspended in polyphosphoric acid. (According to said U.S. Patent, the pigment (quinacridone) is present in salt form in solution; the cited European Offenlegungsschrift leaves open whether the pigments are present in solution or suspension). At any rate, irrespective of whether the pigment is dissolved or only suspended, the procedure of the cited U.S. patent and European Offenlegungsschrift has the effect of completely destroying the previous physical state of the crude pigment, such as, for example, its state of division and possibly crystal modification.

In contrast, the invention's treatment of the prepigments with acid polyphosphate esters surprisingly features no salt formation and no dissolving of the pigment, but produces a significant improvement in the coloristic properties of the pigments after the finishing, such as high tinctorial strength, high purity of color, high dispersibility, excellent gloss and rheology in finishes and printing inks, and high dispersibility, pure color and high tinctorial strength in plastic compositions.

The process according to the invention for preparing organic pigments having excellent application properties comprises treating finely divided crude pigments (organic prepigments) of the anthanthrone, pyranthrone, isoviolanthrone, azo, quinacridone, flavanthrone, indanthrone, naphthaldazine, indigo, thioindigo, tetracarboximide, dioxazine, isoindolinone, perylene, anthrapyrimidine, acylanthraquinone, dianthraquinonyl, azoanthraquinone, azomethineanthraquinone and phthalocyanine series at temperatures of 0° C. to 100° C., preferably 20° C. to 50° C., with acid esters of polyphosphoric acid and a primary, secondary or tertiary alkanol of 1 to 8 carbon atoms, a glycol, glycol ether or phenol, then hydrolyzing the polyphosphate ester used, heating the resultant aqueous mixture to temperatures of 20° C. to 150° C., preferably 80° C. to 130° C., and isolating the pigment in conventional manner.

The acid polyphosphate ester used is prepared by reaction of polyphosphoric acid of a $P_2O_5$ content of 82 to 85% with a primary, secondary or tertiary alkanol of 1 to 8 carbon atoms, such as, for example, methanol, ethanol, isopropanol, isobutanol, amyl alcohol and tertiary butanol, a glycol, such as 1,2-ethylene glycol, propylene glycol, trimethylene glycol, 2,2-dimethylpropane 1,3-diol, 1,3-butylene glycol, 1,4-butylene glycol or 2,3-butylene glycol, a glycol ether, such as ethylene glycol monomethyl ether, ethylene glycol monoethyl ether, ethylene glycol mono-n-butyl ether or diethylene glycol, or a phenol, such as phenol, 2-methylphenol, 3-methylphenol, 4-methylphenol, 2-chlorophenol, 2-bromophenol or 3-nitrophenol.

The underlying polyphosphoric acid is a mixture of oxygen acids of 5-valent phosphorus. The main components are condensation polymers of o-phosphoric acid, in particular linear polymers which have the general formula

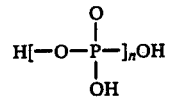

in which n is a number $\geq 2$.

The reaction of polyphosphoric acid with the alcoholic or phenolic compound (hereinafter referred to as hydroxyl compound) to give the ester can be carried out in detail by presenting the polyphosphoric acid and then adding the hydroxyl compound with cooling. However, it is also possible to proceed in the converse manner, namely by proesenting the hydroxyl compound and adding the polyphosphoric acid with cooling. It is in either case necessary to take care that temperature control and rate of addition are adapted to each other in such a way that dehydration of the hydroxyl compound does not take place. The ratio of hydroxyl compound:polyphosphoric acid can vary within wide limits. For instance, it is possible to use 0.5 to 5 times the weight, preferably 1 to 3 times the weight, of hydroxyl compound, relative to polyphosphoric acid. Depending on the weight ratio of hydroxyl compound to polyphosphoric acid used it is possible to set the stability of the acid polyphosphate ester in such a way that it remains thermally stable during the treatment of the pigment. This polyphosphate ester is used in 2 to 8 times, preferably 3 to 5 times, the weight of the prepigment.

The treatment of the prepigment with the polyphosphate ester is preferably carried out in two stages. In the first stage, the prepigment is suspended at 0° to 100° C., the changing viscosity of the suspension indicating the action of the polyphosphate ester on the prepigment. This first stage of the finishing process is then followed by the hydrolysis of the polyphosphate ester and a subsequent treatment with the hydroxyl compound/water mixture at temperatures of 20° to 150° C.

The hydrolysis of the polyphosphate ester used is effected in a manner known per se, namely by adding at the end of the treatment of the prepigment with the polyphosphate ester an amount of water sufficient for the hydrolysis of the ester and heating to a temperature within the specified range, and if desired removing the hydroxyl compound which is liberated at the same time or after its influence has ended by distillation.

It is also possible to add further solvents after the hydrolysis to bring the finishing process to completion.

Surface-active agents can be added not only in the first stage but also in the second stage. Through the addition of appropriate amounts of alkaline compounds it is also possible to obtain the solvent action within the alkaline range. Depending on the desired use, the degree of dispersion of the prepigment and the nature of the treatment with the acid polyphosphate ester need to be adapted to each other.

The pigments isolated in conventional manner (filtration, drying) are distinguished by high tinctorial strength, high purity of color, high dispersibility, excellent gloss and rheology in finishes and printing inks and by high dispersibility, pure color and high tinctorial strength in plastic compositions.

EXAMPLE 1

480 g of polyphosphoric acid (82–84% of $P_2O_5$) are presented and heated to 50° C. 1,440 g of 85% strength isobutanol are then added dropwise at this temperature. Stirring at 50° C. for three hours is followed by addition of 30 g of a surface-active agent (an alkylphenol polyglycol ether sulfate) and then at 50° C. by the addition of 600 g of Prepigment Violet 23, C.I. 51,319, mill base (containing 20% salt from the synthesis) (prepared by salt-free dry milling in accordance with German Patent No. 2,742,575 (U.S. Pat. No. 4,253,839). After stirring at 50° C. for one hour 3,600 ml of water are added, the isobutanol is distilled off at up to 100° C. at the adapter, and the pigment is filtered off with suction, is washed until neutral and is dried at 80° C.

This gives 473 g of pigment which is highly suitable for coloring finishes and printing inks and which is coloristically far superior to the starting prepigment.

EXAMPLE 2

1,440 g of 85% strength isobutanol are presented. To this are added at 50° C. 480 g of polyphosphoric acid (82–84% of $P_2O_5$) in portions. After 16 hours of stirring at 25° C. 30 g of a surface-active agent (alkylphenol polyglycol ether sulfate) are added, followed by 600 g of Prepigment Violet 23, C.I. 51,319, mill base (containing 20% salt from the synthesis) (prepared by salt-free dry milling in accordance with German Patent No. 2,742,575). After stirring at 50° C. for one hour 3,600 ml of water are added. The temperature is then raised to the boil for 5 hours, the isobutanol is distilled off at up to 100° C. at the adapter, and the pigment is filtered off with suction, washed until neutral and dried at 80° C.

This gives 460.5 g of pigment which is highly suitable for coloring finishes and printing inks and which is coloristically far superior to the prepigment.

EXAMPLE 3

160 g of polyphosphoric acid (82–84% of $P_2O_5$) are presented and heated to 50° C. 160 g of 85% strength isobutanol are then added dropwise at this temperature. Stirring at 50° C. for three hours is followed by addition of 10 g of a surface-active agent (an alkylphenol polyglycol ether sulfate) and then at 50° C. by the addition of 100 g of Prepigment Violet 23, C.I. 51,319, mill base (containing 20% salt from the synthesis) (prepared by salt-free dry milling in accordance with German Patent No. 2,742,575). After stirring at 80° C. for three hours 600 ml of water are added, the isobutanol is distilled off at up to 100° C. at the adapter, and the pigment is filtered off with suction, is washed until neutral and is dried at 100° C.

This gives 78.2 g of pigment which is highly suitable for coloring finishes and printing inks and which is coloristically far superior to the prepigment.

EXAMPLE 4

160 g of polyphosphoric acid (82–84% of $P_2O_5$) are presented and heated to 50° C. Subsequently 160 g of 100% strength isobutanol are added dropwise at this temperature. After three hours of stirring, 100 g of Prepigment Violet 23, C.I. 51,319, mill base (containing 20% salt from the synthesis) (prepared by salt-free dry milling in accordance with German Patent No. 2,742,575) are added. After three hours of stirring at 80° C. 600 ml of water are added and the isobutanol is distilled off at up to 100° C. at the adapter. A solution of 10 g of a surface-active agent (alkylphenol polyglycol ether sulfate) in 100 ml of water is then added at 60° C., the mixture is stirred at 60° C. for 1 hour and the pigment is filtered off with suction, washed until neutral and dried at 80° C.

This gives 78.8 g of pigment which is highly suitable for coloring finishes and which is coloristically far superior to the prepigment.

EXAMPLE 5

1,440 g of 85% strength isobutanol are presented, and at 50° C. 480 g of polyphosphoric acid (82–84% of $P_2O_5$) are added in portions. After 16 hours of stirring at 25° C. 600 g of Prepigment Violet 23, C.I. 51,319, mill base (containing 20% salt from the synthesis) (prepared by salt-free dry milling in accordance with German Patent No. 2,742,575) are added. After one hour stirring at 50° C. 3,600 ml of water are added. The temperature is then raised to the boil for 5 hours, and the isobutanol is distilled off at up to 100° C. at the adapter, and the pigment is filtered off with suction, washed until neutral and dried at 80° C.

This gives 443.5 g of pigment which is highly suitable for coloring finishes and plastic compositions and which is coloristically far superior to the prepigment.

EXAMPLE 6

1,440 g of 85% strength isobutanol are presented, and at 50° C. 480 g of polyphosphoric acid (82–84% strength) are added in portions. After 16 hours of stirring at 25° C. 30 g of a surface-active agent (alkylphenol polyglycol ether sulfate) are added, followed by 600 g of Prepigment Violet 23, C.I. 51,319, mill base (containing 20% salt from the synthesis) (prepared by salt-free dry milling in accordance with German Patent No. 2,742,575). After 24 hours of stirring at 25° C. 3,600 ml of water are added, the isobutanol is then distilled off at up to 100° C. at the adapter, and the pigment is filtered off with suction, washed until neutral and dried at 80° C.

This gives 456.7 g of pigment which is highly suitable for coloring finishes and printing inks and which is coloristically far superior to the prepigment.

EXAMPLE 7

1,440 g of 85% strength isobutanol are presented, and at 50° C. 480 g of polyphosphoric acid (82–84% of $P_2O_5$) are added in portions. After 16 hours of stirring at 25° C. 30 g of a surface-active agent (an alkylphenol polyglycol ether sulfate) are added, followed by 600 g of Prepigment Violet 23, C.I. 51,319, mill base (containing 20% salt from the synthesis) (prepared by salt-free dry milling in accordance with German Patent No. 2,742,575). After one hour of stirring at 50° C. 3,600 ml of water are added. The temperature in the autoclave is then raised to 125° C. for 3 hours. The autoclave is then allowed to cool down, and the isobutanol is distilled off at up to 100° C. at the adapter. Finally the pigment is filtered off with suction, washed until neutral and dried at 80° C.

This gives 434.5 g of pigment which is highly suitable for coloring finishes and printing inks and which is coloristically far superior to the prepigment.

EXAMPLE 8

480 g of methyl polyphosphate (82–84% of $P_2O_5$) are presented and heated to 50° C. At this temperature 1,440 g of methanol are added dropwise. After 3 hours of stirring at 50° C. 30 g of a surface-active agent (an alkylphenol polyglycol ether sulfate) are added, followed at 50° C. by 600 g of Prepigment Violet 23, C.I. 51,319, mill base (containing 20% salt from the synthesis) (prepared by salt-free dry milling in accordance with German Patent No. 2,742,575). After stirring at 50° C. for 1 hour 3,600 ml of water are added. After stirring at 50° C. for 1 hour the pigment is filtered off with suction, washed until neutral and dried at 80° C.

This gives 458.3 g of pigment which is highly suitable for coloring finishes and printing inks and which is coloristically far superior to the prepigment.

EXAMPLE 9

160 g of polyphosphoric acid (82–84% of $P_2O_5$) are heated to 50° C. 160 g of ethylglycol are then added dropwise at this temperature. After 3 hours of stirring at 50° C. 5 g of a surface-active agent (an alkylphenol polyglycol ether sulfate) are added, followed by 100 g of Prepigment Violet 23, C.I. 51,319, mill base (containing 20% salt from the synthesis) (prepared by salt-free dry milling in accordance with German Patent No. 2,742,575). After 3 hours of stirring at 50° C. 600 ml of water are added, and the pigment is filtered off with suction, washed until neutral and dried at 80° C.

This gives 75.9 g of pigment which is highly suitable for coloring finishes and printing inks and which is coloristically far superior to the prepigment.

EXAMPLE 10

40 g of polyphosphoric acid (82–84% of $P_2O_5$) are presented and heated to 50° C. 40 g of 85% strength isobutanol are then added dropwise at this temperature, and the solution is stirred at 50° C. for 3 hours. 1.25 g of a surface-active agent (an alkylphenol polyglycol ether sulfate) are then added, followed by 20 g of Prepigment Red 171, C.I. 12,512 (prepared by coupling diazotized 5-nitro-2-aminoanisole with N-5-(2'-hydroxy-3'-naphthoylamino)-benzimidazol-2-one). After 3 hours of stirring at 50° C. 150 ml of water are added, the isobutanol is distilled off at up to 100° C. at the adapter, and pigment is filtered off with suction, washed until neutral and dried at 80° C.

This gives 19.6 g of pigment which is highly suitable for coloring finishes and plastic compositions and which is coloristically far superior to the prepigment.

EXAMPLE 11

40 g of polyphosphoric acid (82–84% of $P_2O_5$) are presented and heated to 50° C. 40 g of 85% strength isobutanol are then added dropwise at this temperature, and the solution is stirred at 50° C. for 3 hours. After addition of 1.25 g of a surface-active agent (an alkylphenol polyglycol ether sulfate) 20 g of Prepigment Red 170, C.I. 12,475 (prepared by coupling diazotized 4-aminobenzimide with N-2-(2'-hydroxy-3'-naphthoylamino)-phenetole) are added, and the solution is stirred at 50° C. for 3 hours. 150 ml of water are then added, the isobutanol is distilled off at up to 100° C. at the adapter and the pigment is filtered off with suction, washed until neutral and dried at 80° C.

This gives 19.3 g of pigment which is highly suitable for coloring finishes and printing inks and which is coloristically far superior to the prepigment.

EXAMPLE 12

20 g of polyphosphoric acid (82–84% of $P_2O_5$) are presented and heated to 50° C. 60 g of 85% strength isobutanol are then added dropwise at this temperature, and the solution is stirred at 50° C. for 3 hours. 1.25 g of a surface-active agent (an alkylphenol polyglycol ether sulfate) are then added, followed by 20 g of Prepigment Blue 60, C.I. 69,800 (prepared by reprecipitation from concentrated sulfuric acid without aftertreatment in accordance with German Offenlegungsschrift 2,540,739 (British Pat. No. 1,463,141). After stirring at 50° C. for 1 hour 150 ml of water are added, and the isobutanol is distilled off at up to 100° C. at the adapter. The pigment is then washed until neutral and dried at 80° C.

This gives 19.2 g of pigment which is highly suitable for coloring finishes and printing inks and which is coloristically far superior to the prepigment.

EXAMPLE 13

20 g of polyphosphoric acid (82–84% of $P_2O_5$) are presented and heated to 50° C. 60 g of 85% strength isobutanol are then added dropwise at this temperature, and a solution is stirred at 50° C. for 3 hours. 1.25 g of a surface-active agent (alkylphenol polyglycol ether sulfate) are then added, followed by 20 g of Prepigment Yellow 24, C.I. 70,600 (prepared in accordance with German Offenlegungsschrift No. 2,540,739 by reprecipitation from concentrated sulfuric acid without after treatment). After one hour of stirring at 50° C. 150 ml of water are added, the isobutanol is distilled off at up to 100° C. at the adapter. The pigment is then filtered off with suction, washed until neutral and dried at 80° C.

This gives 19.7 g of pigment which is highly suitable for coloring finishes and printing inks and which is coloristically far superior to the prepigment.

EXAMPLE 14

40 g of polyphosphoric acid (82–84% of $P_2O_5$) are presented and heated to 50° C. 40 g of 85% strength isobutanol are then added dropwise at this temperature and the solution is stirred at 50° C. for 3 hours. 1.25 g of a surface-active agent (an alkylphenol polyglycol ether sulfate) are then added, followed by 20 g of Prepigment Red 168, C.I. 59,300 (prepared by reprecipitation from concentrated sulfuric acid without aftertreatment in accordance with German Offenlegungsschrift No. 2,540,739), stirring at 50° C. for 1 hour and addition of 150 ml of water. The isobutanol is then distilled off at up to 100° C. at the adapter, and the pigment is filtered off with suction, washed until neutral and dried at 80° C.

This gives 19.9 g of pigment which is highly suitable for coloring finishes and printing inks and which is coloristically far superior to the prepigment.

EXAMPLE 15

80 g of polyphosphoric acid (82–84% of $P_2O_5$) are presented and heated to 50° C. At this temperature 240 g of 85% strength isobutanol are added dropwise, and the solution is stirred at 50° C. for 3 hours. 5 g of a surface-active agent (an alkylphenol polyglycol ether sulfate) are then added, followed by 80 g of Prepigment Red 122, C.I. 73,915 (prepared in accordance with German Patent No. 1,199,906 (British Pat. No. 997,476) by ring closure of the sodium salt of 2,5-di-(4'-methylanilino)-terephthalic acid in polyphosphoric acid), and stirring at 50° C. for 1 hour. After addition of 600 ml of water the isobutanol is distilled off at up to 100° C. at the adapter. The pigment is then filtered off with suction, washed until neutral and dried at 80° C.

This gives 79.5 g of pigment which is highly suitable for coloring finishes and printing inks and which is coloristically far superior to the prepigment.

EXAMPLE 16

40 g of polyphosphoric acid (82–84% of $P_2O_5$) are presented and heated to 50° C. At this temperature 40 g of 85% strength isobutanol are then added dropwise and the solution is stirred at 50° C. for 3 hours. 1.25 g of a surface-active agent (an alkylphenol polyglycol ether sulfate) are then added, followed by 20 g of prepigment Violet 19, C.I. 46,500 (prepared in accordance with German Patent No. 1,199,906 by ring closure of the sodium salt of 2,5-dianilinoterephthalic acid in polyphosphoric acid) and stirring at 50° C. for 3 hours. After addition of 150 ml of water the isobutanol is distilled off at up to 100° C. at the adapter and the pigment is filtered off with suction, washed until neutral and dried at 80° C.

This gives 19.7 g of pigment which is highly suitable for coloring finishes and printing inks and which is coloristically far superior to the prepigment.

EXAMPLE 17

40 g of polyphosphoric acid (82–84% of $P_2O_5$) are presented and heated to 50° C. At this temperature 40 g of 85% strength isobutanol are then added dropwise, and the solution is stirred at 50° C. for 3 hours. 25 g of Prepigment Violet 29, C.I. 71129, mill base (prepared by dry milling in accordance with German Offenlegungsschrift No. 3,018,006 (U.S. Pat. No. 4,431,806)) are then added, and the mixture is stirred at 50° C. for 3 hours. After addition of 150 ml of water the isobutanol is distilled off at up to 100° C. at the adapter and the pigment is filtered off with suction, washed until neutral and dried at 80° C.

This gives 23.1 g of pigment which is highly suitable for coloring finishes and plastic compositions and which is coloristically far superior to the prepigment.

EXAMPLE 18

40 g of polyphosphoric acid (82–84% of $P_2O_5$) are presented and heated to 50° C. At this temperature 40 g of 85% strength isobutanol are then added dropwise, and the solution is stirred at 50° C. for 3 hour. 20 g of Prepigment Red 179, C.I. 71130 (prepared by aqueous condensation in accordance with German Auslegeschrift No. 2,504,481 (U.S. Pat. No. 4,153,602) are then added, and the mixture is stirred at 50° C. for 3 hours. After addition of 150 ml of water the isobutanol is then distilled off at up to 100° C. at the adapter. The pigment is then filtered off with suction, washed until neutral and dried at 80° C.

This gives 19.7 g of pigment which is highly suitable for coloring finishes, in particular metallic effect finishes, and which is coloristically far superior to the prepigment.

EXAMPLE 19

20 g of polyphosphoric acid (82–84% of $P_2O_5$) are presented and heated to 50° C. At this temperature 60 g of 85% strength isobutanol are added dropwise, and the solution is stirred at 50° C. for 3 hours. 20 g of Prepigment Blue 15, C.I. 74160, $\beta$ phase (prepared by salt milling in accordance with German Patent No. 950,799) are then added, and the mixture is stirred at 50° C. for 1 hour. After addition of 150 ml of water the isobutanol is then distilled off at up to 100° C. at the adapter. The pigment is then filtered off with suction, washed until neutral and dried at 80° C.

This gives 19.4 g of pigment which is highly suitable for coloring finishes and plastic compositions and which is coloristically far superior to the prepigment.

We claim:

1. A process for preparing organic pigments having excellent application properties, which comprises treating finely divided crude pigments of the anthanthrone, pyranthrone, isoviolanthrone, azo, quinacridone, flavanthrone, indanthrone, naphthaldazine, indigo, thioindigo, tetracarboximide, dioxazine, isoindolinone, perylene, anthrapyrimidine, acylanthraquinone, dianthraquinonyl, azoanthraquinone, azomethineanthraquinone or phthalocyanine series at temperatures of 0° C. to 150° C., with acid esters of polyphosphoric acid and a primary, secondary or tertiary alkanol of 1 to 8 carbon atoms, a glycol, glycol ether or phenol, then hydrolyzing the polyphosphate ester used, heating the resultant aqueous mixture to temperatures of 20° C. to 150° C., and isolating the pigment in conventional manner.

2. The process as claimed in claim 1, wherein the treatment is carried out with an ester of polyphosphoric acid having a $P_2O_5$ content of 82–85% by weight and of methanol, n- or i-butanol or ethy glycol.

3. The process as claimed in claim 1, wherein the treatment is carried out with a polyphosphate ester in which the weight ratio of hydroxyl compound to polyphosphoric acid is 0.5 to 5:1.

4. The process as claimed in claim 1, wherein the finely divided crude pigment is treated with 2 to 8 times the weight of acid polyphosphate ester.

* * * * *